United States Patent Office 3,563,944
Patented Feb. 16, 1971

3,563,944
COLLOID FREE EMULSIONS OF VINYL ACETATE COPOLYMERS
Ralph H. Bauer, Huntington Beach, and Peter Stanley Backlund, Anaheim, Calif., assignors to Union Oil Company of California, Los Angeles, Calif., a corporation of California
No Drawing. Filed Nov. 24, 1967, Ser. No. 685,300
Int. Cl. C08f 1/13, 45/24
U.S. Cl. 260—29.6                              7 Claims

ABSTRACT OF THE DISCLOSURE

Copolymerization of vinyl acetate with acrylates, maleates and fumarates in a colloid free aqueous media using a three-component emulsion. The last component is added following completion of the polymerization.

---

This invention relates to new and improved vinyl acetate copolymers with alkyl acrylates, alkyl fumarates and alkyl maleates having twelve carbons or less in the molecule. More specifically, this invention relates to vinyl acetate copolymers with one or more of these comonomers such as: butyl acrylate, 2-ethylhexyl acrylate, acrylic acid, dioctyl fumarate, dioctyl maleate, dibutyl fumarate and dibutyl maleate and the process for their manufacture.

In the free radical catalyzed polymerization of vinyl acetate copolymers in an emulsion, it is customary to employ a colloid to stabilize the reaction mixture. However, use of a colloid increases the viscosity of the reaction mixture, and because the polymerization is diffusion controlled, additional catalyst is required to maintain the polymerization at a realistic rate. If, however, a surfactant system can be found to markedly lower viscosity, less catalyst may be used to maintain the appropriate reaction rate. Lower reaction temperatures are then also possible. Such a system will produce a very high molecular weight polymer. Because molecular weight is directly related to toughness, if the vinyl acetate copolymer is used as a paint, the scrub resistance (the equivalent of toughness) of the paint will be greatly increased.

Vinyl acetate can be copolymerized with various materials to produce paint emulsions having properties which can be widely altered with changes in the comonomer. Use of a particular comonomer will be dictated by raw material cost, availability and end use properties. Since these dictates can alter rapidly, it is highly desirable for a manufacturer of vinyl acetate copolymers to produce them in good quality with no modification in plant procedure. In addition to good scrub resistance, a low film forming temperature, good mechanical stability and a high solids content are necessary for a satisfactory paint latex.

Accordingly, it is an object of the invention to provide a copolymer of vinyl acetate with about 5–30% of one or more of an alkyl acrylate, alkyl fumarate and alkyl maleate having 12 carbons or less in the molecule.

Another object is to provide a copolymer of vinyl acetate with about 5–30% of one or more of: butyl acrylate, 2-ethylhexyl acrylate, acrylic acid, dioctyl fumarate, dioctyl maleate, dibutyl fumarate and dibutyl maleate.

Another object is to provide a vinyl acetate copolymer having high molecular weight, increased scrub resistance, high solids content, good mechanical stability, high viscosity and low film forming temperature, which copolymer is especially useful in a paint formulation.

Another object is to provide a new and improved process for the free radical catalyzed emulsion polymerization of the above copolymers in a colloid free aqueous medium.

Another object is to provide a new and improved surfactant system by which said process may be carried out.

Further objects of the invention will become apparent from the description to follow.

The objects of the invention are attained by copolymerizing vinyl acetate with one or more of the above named monomers in an aqueous medium containing a surfactant; adding further amounts of vinyl acetate, monomer and catalyst to maintain the reaction; continuing the polymerization by adding additional catalyst until only a residual amount of monomer remains; cooling and finally adding a surfactant to the reaction mixture.

The reaction is most conveniently carried out at atmospheric pressure, although other pressure levels may be employed.

The temperature employed is preferably as low as possible commensurate with maintaining a suitable reaction rate. Preferably, the copolymerization is initiated by heating slowly until the copolymerization temperature is reached; the temperature is then increased by adding the reactants at a rate slightly greater than the rate of reaction; the amount of temperature increase being governed by the molecular weight to be attained and by the desirability of minimizing surfactant decomposition.

The pH of the reaction mixture is maintained between about 4–6 and preferably about 4.9–5.15 by buffering with sodium bicarbonate.

The reaction is carried out in an aqueous media; this has the advantage of eliminating a solvent type reaction which can contribute to air pollution if the latter were used on a large scale.

Although a single surfactant may be adequate, three surfactant components used as described below are preferred for high molecular weight and outstanding mechanical stability.

During the copolymerization itself, the first component surfactant mixture employed contains a tertiary octyl phenol poly ether alcohol having 40 ethylene oxide units; this is sold as an 80% solution under the trade name of Triton X–405 by Rohm and Haas.

The second component surfactant is a polyoxyethylene-polyoxypropylene block copolymer containing 80% polyoxyethylene and having a molecular weight about 8800; this is sold by the Wyandotte Chemical Co. under the trade name of Pluronic F–68.

Upon completion of the reaction, that is, when only a residual amount of monomer remains, the third component surfactant, sodium dihexyl sulfosuccinate, is then added; this unlike the Triton X–405 and Pluronic F–68, is an anionic surfactant. It is sold as an 80% solution by the American Cyanamid Company under the trade name of Aerosol MA–80. This surfactant is designed primarily to impart mechanical stability to the latex whereas the Triton X–405 and Pluronic F–68 are primarily designed to reduce the emulsion viscosity so that maximum molecular weight is attained during polymerization. Addition of the Aerosol MA–80 must be made upon completion of the reaction. If added prior to commencement of the reaction, use of low concentrations does not impart me chanical stability while at high concentrations it results in excessive foaming.

Other alkylphenoxypoly (ethyleneoxy) ethanol-aliphatic based polyether combinations may be used for the polymerization itself. Also a variety of anionic surfactants are suitable for post addition to improve mechanical stability. Typical examples of the surfactants contemplated by this invention are shown below.

FIRST COMPONENT

Alkylphenoxypoly (ethyleneoxy) ethanol

Igepal CA-730—General Aniline and Film
Tergitol NP-40—Union Carbide
Triton X-305—Rohm and Haas
Igepal CO-970—General Aniline and Film

SECOND COMPONENT

Polyoxypropylene-polyoxyethylene block copolymers

Pluronic L-61—Wyandotte
Pluronic F-88—Wyandotte
Tetronic 908—Wyandotte
Tetronic 701—Wyandotte Alkylpoly (ethyleneoxy) ethanol Tergitol 15S12—Union Carbide
Tergitol 15S5—Union Carbide
Emulphogene BC-420—General Aniline and Film
Siponic L-25—Alcolae

THIRD COMPONENT

Sulfated alkylphenoxypoly (ethyleneoxy) ethanol

Alipal CO-433—General Aniline and Film
Triton X-200—Rohm and Haas

Alkyl aromatic sulfonate

Sorapon SF-78—General Aniline and Film
Sulfranim 40—Witco Chemical

Dialkyl sulfosuccinates

Aerosol MA-80—Cyanamid
Triton GR-5—Rohm and Haas

Complex organic phosphates

Surfactant XQS9—Rohm and Haas
GATAC RE-610—General Aniline and Film

Fatty alcohol sulfate

Sipex BuS—Alcolae Chemical
Sipex SB—Alcolae Chemical

EXAMPLE

To a steam heated 2½ gallon, stainless-steel reactor equipped with an air motor driven stirrer, reflux condenser, and two graduated addition funnels is added with stirring 2320 g. deionized water, 348 g. Triton X-405, 80.0 g. Pluronic F-68, 16 g. sodium bicarbonate, 4.0 g. potassium persulfate, 356 g. of a mixture of vinyl acetate and the desired comonomer in the desired proportion. Normally this mixture is prepared in a separate container in in which event 120 g. deionized water is used as a rinse.

The reactor is heated to 150±1° F. at which time the polymerization begins and little or no external heating is required. Addition of the monomer mixture, 3242 g. of the desired proportions of vinyl acetate and the desired comonomer is begun. The rate of addition slightly exceeds the rate of reaction so that the excess refluxing monomer mixture controls the temperature to 159±1° F. The temperature should not exceed 161° F. during polymerization so that maximum molecular weight is obtained and minimum surfactant decomposition results. The monomer mixture is normally added over a period of 1 hour 45 minutes, however, addition rates varying as much as 30 minutes in either direction have been found to give a suitable product.

When monomer addition is complete the reaction temperature is slowly allowed to increase to 166±2° F. The reaction is continued for 1 hour at this temperature at which time 2.8 g. potassium persulfate dissolved in 60.0 g. deionized water is added to the emulsion. The reaction is continued at 166±2° F. for an additional hour and the residual monomer concentration is determined. If it exceeds 0.5%, a second portion of 2.8 g. potassium persulfate in 60.0 g. water is added and the reaction is continued until the residual monomer is less than 0.5%.

The emulsion is cooled to at least 90° F. and 15 g. Aerosol MA-80, dissolved in 30 g. deionized water is added. (The additional 10 g. water is used to rinse the mixing container.) The emulsion is stirred 15 minutes and is then transferred to storage.

The weights and percentages of the ingredients are as follows:

|  | Grams | Percent |
| --- | --- | --- |
| Deionized water | 2,540.0 | 38.47 |
| Triton X-405 | 348.0 | 5.27 |
| Pluronic F-68 | 80.0 | 1.21 |
| Sodium bicarbonate | 16.0 | 0.24 |
| Potassium persulfate | 4.0 | 0.0605 |
| Vinyl acetate plus comonomer | 3,598.0 | 54.48 |
| Potassium persulfate | 2.8 | 0.0423 |
| Aerosol MA-80 | 15.0 | 0.22 |
| Total | 6,603.8 | 99.9928 |

The following Tables I and II show typical properties of various vinyl acetate copolymer emulsions produced by the process of this invention and their comparison with similar commercial materials. It will be observed that generally the copolymers of the present invention are significantly better in one or more properties of mechanical stability, scrub resistance and solids content (non volatiles). When comparing vinyl acetate acrylate copolymers with, say, vinyl acetate dibutyl maleate or fumarate copolymers, it must be remembered that the acrylate comonomer costs about 10¢ per pound more than the dibutyl maleate, dibutyl fumarate, etc.

When carrying out the ASTM D2486-66T scrub resistance test, the following formulation, as parts by weight, is used to produce a 50 PVC (Pigment Volume Concentration) paint for the test.

| | |
| --- | --- |
| Water | 200.0 |
| Hydroxypropyl methycellulose (Methocel—Dow) | 5.0 |
| Pigment dispersant: anionic polymer-type dispersing agent (Tamol 731—Rohm and Haas) | 5.0 |
| Nonylphenoxypoly (ethyleneoxy) ethanol (Igepal 630—General Aniline & Film) | 3.0 |
| Potassium tri polyphosphate | 2.0 |
| Ethylene glycol | 20.0 |
| Defoamer (Nopco NDW—NOPCO Chemical) | 2.0 |
| Di(phenylmercuric) dodecinyl succinate (Super-ACT-IT:Tenneco) | 6.0 |
| Titanium dioxide | 200.0 |
| Filler (Clay—ASP 600) | 100.0 |
| Calcium carbonate | 150.0 |
| Water | 204.0 |
| Polymer emulsion—55% solids | 276.0 |

TABLE I.—TYPICAL PROPERTIES OF VARIOUS VINYL ACETATE COPOLYMER EMULSION MADE EMPLOYING PRESENT INVENTION

| Type | Non volatiles, percent | Brookfield viscosity, cps.[1] | Weight/gallons, lbs. | pH | Film clarity | Water spot, minutes | Mechanical stability, minutes [2] | Scrub resistance cycles [3] | Minimum film temperature °F. |
|---|---|---|---|---|---|---|---|---|---|
| 85% vinly acetate-15% butyl acrylate | 59.0 | 2,190 | 9.1 | 5.1 | Clear | 5 | Excellent | 2,315 | 54 |
| 80% vinyl acetate-20% butyl acrylate | 58.4 | 1,560 | 9.1 | 5.05 | Slight haze | 8 | do | 2,399 | 45 |
| 80% vinyl acetate-20% dibutyl fumarate | 59.4 | 3,810 | 9.2 | 5.1 | do | 8 | do | 1,216 | 50 |
| 80% vinyl acetate-20% dibutyl maleate | 58.9 | 2,930 | 9.15 | 4.9 | do | 8 | do | 1,139 | 52 |
| 85% vinyl acetate-15% dibutyl maleate | 61.2 | 2,210 | 9.3 | 5.0 | do | 7 | do | 1,197 | 60 |
| 85% vinyl acetate-15% 2-ethylhexyl acrylate | 59.5 | 2,180 | 9.1 | 5.1 | do | 8 | do | 2,042 | 50 |
| 85% vinyl acetate-15% dibutyl fumarate | 59.2 | 2,120 | 9.2 | 5.0 | do | 8 | do | 1,590 | 59 |
| 80% vinyl acetate-20% 2-ethylhexyl acrylate | 58.9 | 2,420 | 9.1 | 5.15 | do | 8 | do | 1,939 | 40 |
| 74% vinyl acetate-26% dibutyl fumarate | 58.2 | 2,330 | 9.1 | 5.0 | do | 3 | do | 959 | 49 |
| 74% vinyl acetate-26% dibutyl maleate | 58.3 | 3,380 | 9.1 | 5.0 | do | 3 | do | 1,222 | 50 |
| 80% vinyl acetate-20% dibutyl maleate | 58.9 | 2,230 | 9.1 | 4.95 | do | 3 | do | 1,494 | 54 |
| 80% vinyl acetate-20% dibutyl fumarate | 58.7 | 1,980 | 9.1 | 4.9 | do | 3 | do | 1,811 | 50 |
| 80% vinyl acetate-20% dioctyl fumarate | 60.1 | 3,460 | 9.05 | 4.9 | do | 3 | do | 1,687 | 40 |
| 80% vinyl acetate-20% dioctyl maleate | 59.5 | 4,280 | [4] 8.7 | 4.9 | do | 3 | do | 1,665 | 43 |

[1] At 20 r.p.m. with #3 spindle.
[2] Agitated 15 minutes in Waring Blendor at high speed.
[3] ASTM D2486-66T.
[4] Foam.

TABLE II.—TYPICAL PROPERTIES OF VARIOUS COMMERCIALLY AVAILABLE VINYL ACETATE COPOLYMER EMULSIONS

| Type | Trade name | Manufacturer | Non volatiles, percent | Brookfield viscosity, cps.[1] | Weight/gallons, lbs. |
|---|---|---|---|---|---|
| Acrylate | AC 34 | Rohm & Haas | 46.7 | 250 | 8.95 |
| Do | AC 35 | do | 48.1 | 170 | 8.95 |
| Do | AC 22 | do | 45.0 | 1,400 | 9.0 |
| Vinyl acetate-maleate | Flexbond 860 | Air reduction | 53.3 | 1,360 | 9.1 |
| Vinyl acetate-acrylate | Flexbond 315 | do | 55.7 | 1,670 | 9.1 |
| Vinyl acetate-fumarate | Poly CO 804 | Borden | 57.1 | 1,230 | 9.1 |
| Vinyl acetate-acrylate | Resyn 25-2813 | National Starch | 45.4 | 400 | 9.0 |
| Do | CL 222 | Celanese | 55.4 | 1,000 | 9.1 |
| Do | Wallpol 40-128 | Reichhold | 56.8 | 1,320 | 9.1 |
| Do | Wallpol 40-129 | do | 54.9 | 1,720 | 9.1 |
| Do | UCAR 180 | Union Carbide | 54.7 | 800 | 9.1 |
| Do | UCAR 360 | do | 56.3 | 740 | 9.1 |
| Do | Everflex 500 | Dewey & Alma | 55.0 | 760 | 9.0 |

| Type | pH | Film clarity | Water spot, minutes | Mechanical stability, minutes [2] | Scrub resistance cycles [3] | Minimum film temperature, °F. |
|---|---|---|---|---|---|---|
| Acrylate | 9.15 | Clear | 22+ | Good, 13 min | 1,542 | 41 |
| Do | 8.2 | do | 22+ | Fair, 5 min | 1,713 | 43 |
| Do | 8.8 | do | 0.5 | Excellent | 444 | 49 |
| Vinyl acetate-maleate | 5.0 | do | 6 | do | 737 | 54 |
| Vinyl acetate-acrylate | 4.2 | do | 20+ | do | 1,076 | 44 |
| Vinyl acetate-fumarate | 4.35 | do | 0.75 | do | 582 | 57 |
| Vinyl acetate-acrylate | 4.2 | do | 2 | do | 606 | 32 |
| Do | 4.2 | do | 7 | do | 1,545 | 48 |
| Do | 4.75 | do | 15 | do | 856 | 50 |
| Do | 4.85 | do | 15 | do | 751 | 53 |
| Do | 4.7 | do | 9 | do | 440 | 46 |
| Do | 5.2 | Slight haze | 6 | do | 1,237 | 48 |
| Do | 5.15 | Clear | 0.25 | do | 1,772 | 49 |

[1] At 20 r.p.m. with #3 spindle.
[2] Agitated 15 minutes in Waring Blendor at high speed.
[3] ASTM D2486-66T.

It will be observed from Table I that the solids concentration is very high, varying from about 58–60%; usually only 50–55% solids concentration is found in commercial latexes. Furthermore, the mechanical stability is excellent and the minimum film forming temperature is low. The scrub resistance of the vinyl acetate-butyl acrylate-copolymer is 2399 cycles while the same type commercial product had a scrub resistance of only 1542 cycles. The scrub resistances of the remaining copolymers varied from 1197 to 2082, while the scrub resistance of twelve similar commercial copolymers ranged from 400–1000 cycles using the method prescribed in ASTM D2486-66T. The percentage of ester copolymerizable with the vinyl acetate is shown as varying from 15–20%; however, a 5–30% concentration is also operable and within the scope of the invention.

It will be noted that only about 0.06% catalyst is required for the copolymerization of the present invention whereas the usual amounts of catalyst requirements are about 0.2%. By decreasing the catalyst to a low concentration while maintaining suitable reaction rates, the reaction temperature can be lowered and the molecular weight of the polymer will be increased. As a consequence, the toughness, as measured by scrub resistance will also be increased.

We claim:

1. A process for the free radical catalyzed emulsion copolymerization of vinyl acetate with about 5–30% by weight of one or more monomers selected from the class consisting of: acrylic acid, alkyl acrylate, alkyl fumarate and alkyl maleate having 12 carbons or less in the molecule which comprises adding an initial amount of vinyl acetate, said monomer, a catalyst and only a non-ionic surfactant to a colloid-free aqueous medium maintained at a pH of 4–6 and adding further amounts of vinyl acetate, monomer and catalyst during the course of the reaction; continuing the polymerization by adding additional catalyst until only a residual amount of monomer remains; cooling and finally adding anionic surfactant to the reaction mixture to impart mechanical stability to the resulting latex, said anionic surfactant being added only after substantial completion of the copolymerization.

2. The process of claim 1 wherein said monomer is selected from the class consisting of: acrylic acid, butyl acrylate, 2-ethylhexyl acrylate, dioctyl fumarate, dioctyl maleate, dibutyl fumarate and dibutyl maleate, and mixtures thereof, said non-ionic surfactant is a tertiary octyl phenol polyether alcohol or a polyoxypropylene-polyoxyethylene block copolymer.

3. The process of claim 2 in which the copolymerization is carried out at atmospheric pressure.

4. The process of claim 2 in which the pH of the reaction mixture is maintained between about 4.9–5.15.

5. The process of claim 1 in which the non-ionic surfactant comprises the combination of an alkylphenoxypoly (ethyleneoxy) ethanol and a surfactant selected from the class consisting of polyoxypropylene-polyoxyethylene block copolymers and alkylpoly (ethyleneoxy) ethanols; and the anionic surfactant is selected from the class consisting of: sulfated alkylphenoxypoly (ethyleneoxy) ethanols, alkyl aromatic sulfonates, dialkyl sulfosuccinates, complex organic phosphates and fatty alcohol sulfates.

6. The process of claim 5 in which said first non-ionic surfactant is a tertiary octyl phenol polyether alcohol having 40 ethylene oxide units; said second non-ionic surfactant is a polyoxyethylene-polyoxypropylene block copolymer containing 80% polyoxyethylene and having a molecular weight of about 8800; said anionic surfactant is sodium dihexyl sulfosuccinate.

7. The process of claim 1 in which the free radical catalyst is potassium persulfate.

References Cited

UNITED STATES PATENTS

| 2,739,910 | 3/1956 | McGarvey | 260—29.6EMX |
| 2,868,748 | 1/1959 | Frazier et al. | 260—86.3X |
| 3,226,375 | 12/1965 | Greth et al. | 260—29.6EMX |
| 3,399,157 | 8/1968 | Deex et al. | 260—29.6EM |

FOREIGN PATENTS

| 249,041 | 1/1964 | Australia | 260—29.6EM |
| 1,093,558 | 11/1960 | Germany | 260—29.6EM |

MURRAY TILLMAN, Primary Examiner

H. ROBERTS, Assistant Examiner

U.S. Cl. X.R.

117—161; 260—41, 78.5, 80.8, 85.7, 86.1, 874, 901